(12) United States Patent
Chen

(10) Patent No.: US 11,162,258 B2
(45) Date of Patent: Nov. 2, 2021

(54) COMPOSITE FIREPROOF BOARD AND METHOD OF PROCESSING AND PREPARING THE SAME

(71) Applicant: Wellmade Floor Industries Co., Ltd., Jiangsu (CN)

(72) Inventor: Zhu Chen, Nanjing (CN)

(73) Assignee: WELLMADE FLOOR INDUSTRIES CO., LTD., Jiangsu (CN)

( * ) Notice: Subject to any disclaimer, the term of this patent is extended or adjusted under 35 U.S.C. 154(b) by 0 days.

(21) Appl. No.: 16/611,114

(22) PCT Filed: May 11, 2018

(86) PCT No.: PCT/CN2018/085327
§ 371 (c)(1),
(2) Date: Nov. 5, 2019

(87) PCT Pub. No.: WO2019/213794
PCT Pub. Date: Nov. 14, 2019

(65) Prior Publication Data
US 2021/0062501 A1    Mar. 4, 2021

(51) Int. Cl.
*E04C 2/06* (2006.01)
*E04B 1/94* (2006.01)
*B28B 1/16* (2006.01)
*E04F 15/10* (2006.01)

(52) U.S. Cl.
CPC ............... *E04B 1/941* (2013.01); *B28B 1/16* (2013.01); *E04F 15/107* (2013.01)

(58) Field of Classification Search
CPC . C04B 28/14; E04C 2/043; E04C 2/06; E04C 2/384; E04B 1/942; B32B 2262/101; B32B 2607/00
See application file for complete search history.

(56) References Cited

U.S. PATENT DOCUMENTS

| | | | | |
|---|---|---|---|---|
| 1,534,088 | A | * | 4/1925 | Shaw ...................... E04F 13/04 52/443 |
| 3,604,174 | A | * | 9/1971 | Nelson, Jr. ................ E04C 2/06 52/601 |
| 4,015,393 | A | * | 4/1977 | Warwick ................. E04C 2/386 428/119 |
| 5,071,000 | A | * | 12/1991 | Stewart ..................... A47G 1/12 206/6.1 |
| 6,260,326 | B1 | * | 7/2001 | Muller-Hartburg .... E04F 15/02 52/601 |

(Continued)

FOREIGN PATENT DOCUMENTS

CN    2533176 Y    1/2003
CN    201144497 Y    11/2008
(Continued)

*Primary Examiner* — Brian E Glessner
*Assistant Examiner* — Daniel J Kenny
(74) *Attorney, Agent, or Firm* — Thompson Coburn LLP

(57) ABSTRACT

A composite fireproof board has a structure that includes, from top to bottom, a bottom layer, a lower reinforcement mesh layer, a middle layer, an upper reinforcement mesh layer, and a surface layer. The middle layer includes an organic frame and an inorganic fireproof material filled within the frame. The frame is provided with fixed grooves on edges adjacent to the fireproof material, and is further provided with through holes.

15 Claims, 14 Drawing Sheets

(56) References Cited

U.S. PATENT DOCUMENTS

| | | | | |
|---|---|---|---|---|
| 6,295,786 | B1* | 10/2001 | Lee | B32B 3/18 |
| | | | | 52/745.19 |
| 7,617,606 | B2* | 11/2009 | Robbins, Sr. | E06B 3/82 |
| | | | | 156/254 |
| 9,016,019 | B2* | 4/2015 | VonDross | E04C 1/40 |
| | | | | 52/426 |
| 9,027,296 | B2* | 5/2015 | Daniels | C04B 20/0048 |
| | | | | 52/232 |
| 2009/0208714 | A1* | 8/2009 | Currier | E04D 11/02 |
| | | | | 428/212 |
| 2010/0012011 | A1* | 1/2010 | Gerst | B63B 35/38 |
| | | | | 114/263 |

FOREIGN PATENT DOCUMENTS

| | | |
|---|---|---|
| CN | 102477778 A | 5/2012 |
| CN | 102597387 A | 7/2012 |
| CN | 205976306 U | 2/2017 |
| EP | 0726199 A1 | 8/1996 |

* cited by examiner

COMPOSITE FIREPROOF BOARD AND METHOD OF PROCESSING AND PREPARING THE SAME

RELATED APPLICATION DATA

This application claims the benefit of PCT Application PCT/CN2018/085327 filed May 11, 2018.

TECHNICAL FIELD

The present invention relates to a floor, and in particular, to a composite fireproof board easy for processing and a preparation method thereof.

BACKGROUND ART

A lock floor is made by providing grooves and tongues on adjacent floor boards and fixing the floor boards by fitting the grooves with the tongues. In the flooring process, the lock floor can be directly laid on the ground without using any nails, glue, and keels, thereby preventing the floor joint from cracking. Moreover, the floor is easy to install and can be repeatedly assembled and disassembled, so it is very popular on the current floor market. However, the lock floor is very strict with the base material. Because the lock force of the lock floor depends entirely on the joint between the grooves and tongues, the structure of the grooves and tongues needs to be very precise and smooth. At present, most lock floors use organic materials such as high-density resin as major materials. Such lock floors are advantageous in having good processability. However, the organic board has two disadvantages: firstly, it is not resistant to high temperature and is deformed easily by heat, and therefore the grooves and tongues will be deformed and failed to be connected; secondly, it is not fireproof.

Inorganic boards such as glass-magnesium boards, magnesite boards, calcium silicate boards, cement boards, and the like have good fireproof performance, as well as good heat conductivity, high stability, and good strength, thus being widely used in building partition panels, ceiling, door planks, and other fields at present. However, due to the poor processability of the inorganic boards, the processed structure of grooves and tongues can be easily cracked when being used for the lock floor, resulting in a failure in connection between adjacent boards.

SUMMARY OF THE INVENTION

The objective of the present invention is to provide a composite fireproof board easy for processing, in which an organic frame is disposed on the periphery of an inorganic fireproof board. Therefore, the composite fireproof board achieves good processability as well as fireproof performance, and can be processed into a lock structure easily. The present invention adopts the inorganic material as a major material of the board, which has good fireproof performance and waterproof performance, is capable of phase-change energy storage, and achieves high stability and strength. The organic frame disposed on the periphery of the inorganic material enables the board to have good processability. Providing fixed grooves and through holes on the frame can achieve a firmer combination between the fireproof material and the frame, and prevent the frame from stripping off or cracking. Covering a reinforcement mesh layer and a thin-bedded inorganic material above and below the middle layer can increase the tenacity and strength, prevent cracking at the joint, and achieve a fireproof effect.

The technical solution adopted in the present invention is: a composite fireproof board easy for processing, having a structure including, from bottom to top, a bottom layer, a lower reinforcement mesh layer, a middle layer, an upper reinforcement mesh layer, and a surface layer, wherein the middle layer includes a frame and an inorganic fireproof material filled within the frame, the frame is made of an organic material, the frame is provided with fixed grooves on edges adjacent to the inorganic fireproof material, and the frame is further provided with one or more through holes.

Preferably, the hole is provided on the frame, the axial direction of the hole is substantially perpendicular to the surface of the composite fireproof board, and the diameter of the holes is less than or equal to a quarter of the width of the frame.

Preferably, the hole is provided in the fixed groove, the axial direction of the hole is substantially parallel to the surface of the composite fireproof board, and the diameter of the hole is less than or equal to a quarter of the thickness of the frame.

Preferably, the fixed groove is swallow-tailed groove, a T-shaped groove, or a cross groove.

Preferably, the organic material is plastic, organic glass, rubber, bamboo, wood, a stone plastic material, or a wood plastic material.

Preferably, the middle layer has a thickness of 3-300 mm.

Preferably, the bottom layer has a thickness of 0.5-15.5 mm, and is made of an inorganic fireproof material.

Preferably, the surface layer has a thickness of 0.5-15.5 mm, and is made of an inorganic fireproof material.

Preferably, the inorganic fireproof material is a magnesite material, a magnesium oxysulfide material, a magnesium oxychloride material, a calcium silicate material, or cement.

Preferably, the lower reinforcement mesh layer and the upper reinforcement mesh layer are made of glass fiber mesh, carbon fiber mesh, plastic mesh, or metal wire mesh.

Preferably, the lower reinforcement mesh layer and the upper reinforcement mesh layer have a grid size of 3-10 mm*3-10 mm.

Preferably, a skin layer is further disposed on the surface layer, and the skin layer is made of impregnated paper, a wood plate, cork, a bamboo plate, a plastic film, ceramic tiles, leather, aluminum alloy, a plastic plate, a carpet, a stone plastic plate, or a wood plastic plate.

Preferably, a balancer layer is further disposed below the bottom layer, and balancer layer is made of impregnated paper, a wood plate, a bamboo plate, cork, or foamed plastic. The balancer layer achieves effects of balancing, buffering, muting and sound insulation.

The present invention further discloses a composite fireproof floor easy for processing, wherein a skin layer is disposed on the surface layer of the above composite fireproof board easy for processing.

Preferably, the skin layer is made of impregnated paper, a wood plate, cork, a bamboo plate, a plastic film, ceramic tiles, leather, aluminum alloy, a plastic plate, a carpet, a stone plastic plate, or a wood plastic plate.

Preferably, composite fireproof floor easy for processing further includes a balancer layer disposed below the bottom layer.

Preferably, the balancer layer is made of impregnated paper, a wood plate, a bamboo plate, cork, or foamed plastic.

The present invention further discloses a composite fireproof wallboard easy for processing, wherein a skin layer is disposed on the surface layer of the above composite fireproof board easy for processing.

Preferably, the skin layer is made of impregnated paper, a wood plate, cork, a bamboo plate, a plastic film, ceramic tiles, leather, aluminum alloy, a plastic plate, a carpet, a stone plastic plate, or a wood plastic plate.

Preferably, the composite fireproof wallboard easy for processing further includes a balancer layer disposed below the bottom layer.

Preferably, the balancer layer is made of impregnated paper, a wood plate, a bamboo plate, cork, or foamed plastic.

The present invention further discloses a preparation method of the above composite fireproof board easy for processing, including steps of:

(1) preparing a frame, and forming fixed grooves and holes on the frame through processing;

(2) preparing a mushy inorganic fireproof material, laying the material on a template, and flattening the material into a bottom layer;

(3) laying a lower reinforcement mesh layer on the bottom layer before the bottom layer is cured;

(4) placing the frame on the lower reinforcement mesh layer, injecting the mushy inorganic fireproof material into the frame, flattening, and filling the inorganic material into the whole frame as well as in the fixed grooves and the holes, to form a middle layer;

(5) laying an upper reinforcement mesh layer on the middle layer before the board of the middle layer is cured;

(6) laying a layer of the mushy inorganic fireproof material on the upper reinforcement mesh layer, and flattening, to form a surface layer; and (7) performing maintenance after curing and demoulding.

The present invention adopts an inorganic material as a major material of the board, which has good fireproof performance and waterproof performance, is capable of phase-change energy storage, and achieves high stability and strength. The organic frame disposed on the periphery of the inorganic material enables the board to have good processability, and grooves and tongues can be formed on the frame through processing to produce lock floors, wallboards, and other products. Providing fixed grooves and through holes on the frame can achieve a firmer combination between the fireproof material and the frame, and prevent the frame from stripping off or cracking. The holes can be disposed to be perpendicular to the direction of the panel of the composite fireproof board, so as to act as nails to bond the upper and lower layers of the composite fireproof board and bond the inorganic board and the organic frame more tightly. The holes can also be provided in the fixed grooves to form transverse bolts one by one between the inorganic board and the organic frame, so that the inorganic board and the organic frame are bonded more tightly. Moreover, if the holes are provided in the fixed grooves, the inorganic material can be more easily filled into the holes. Covering a reinforcement mesh layer and a thin layer of inorganic material above and below the middle layer can make the board have good fireproof and waterproof performance, increase the tenacity and strength, and prevent cracking at the joint. The composite fireproof board of the present invention can be used in wall panels, furniture panels, packaging materials and so on, in addition to floors. Fitting a skin layer on the surface of the composite fireproof board can achieve effects of decoration and wear resistance, and fitting a balancer layer on the back can achieve effects of balancing, buffering, muting and sound insulation.

The present invention is described in further detail hereinafter with reference to the accompanying drawings and embodiments.

DETAILED DESCRIPTION

Embodiment 1

Figure 1:
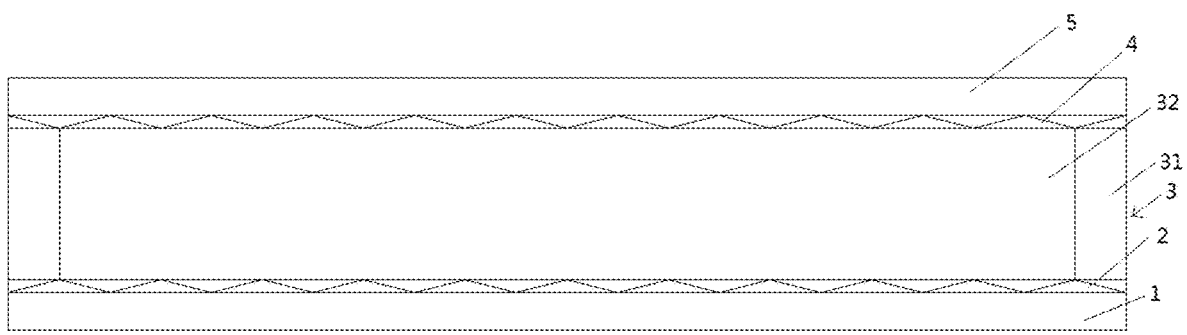
FIG. 1 is a schematic structural diagram of a composite fireproof board easy for processing of the present invention.
Figure 2:
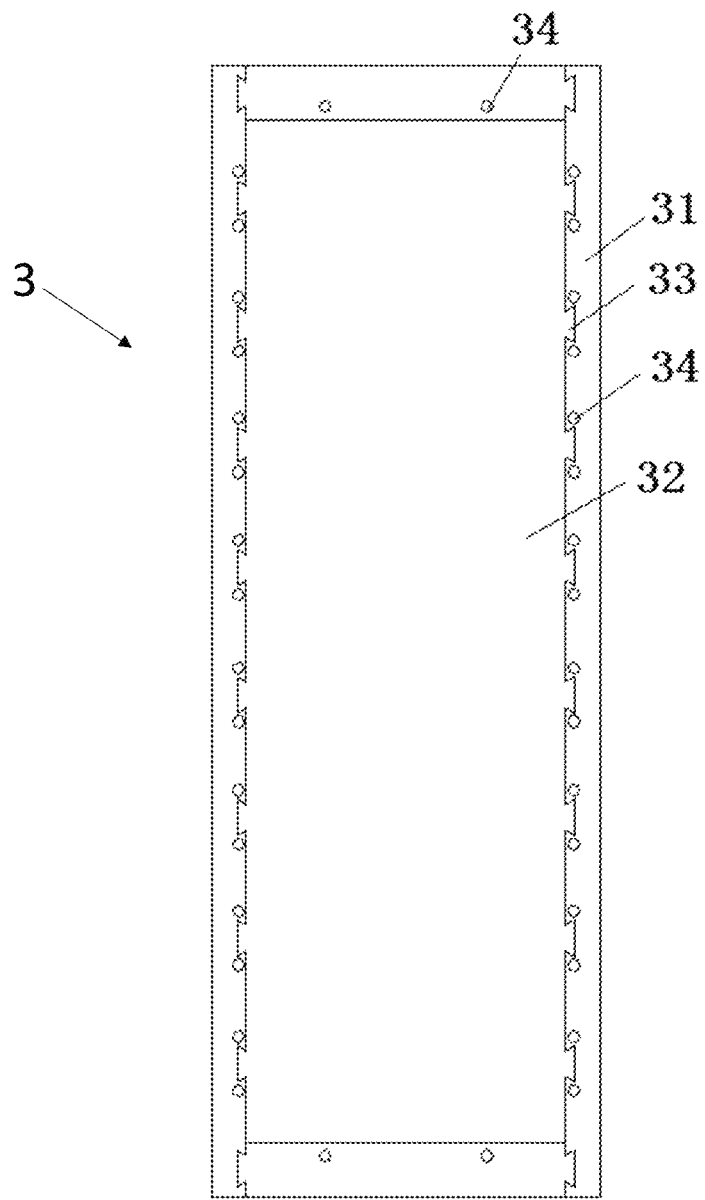
FIG. 2 is a schematic structural diagram of a middle layer in Embodiment 1.

As shown in FIG. 1-FIG. 2, the present composite fireproof board easy for processing has a structure including, from bottom to top, a bottom layer 1 having a thickness of 0.5 mm and made of a magnesite material for preparing magnesite plates;

a lower reinforcement mesh layer 2 made of glass fiber mesh and having a specification of 5 mm*5 mm;

a middle layer 3 having a thickness of 3 mm and consisting of a frame 31 and an inorganic fireproof material 32 filled within the frame, wherein the size of the frame and the size of the board are determined according to specific production demands; the frame is formed by combining two long edges and two short edges; the length of the long edge is equal to the length of the composite fireproof board; the long edges are provided with swallow-tailed grooves 33 at joints with the short edges; the short edges are provided with corresponding swallow-tailed bulges at corresponding positions; the long edges and the short edges are fixedly connected through the swallow-tailed grooves and the swallow-tailed bulges; the frame is also provided with swallow-tailed grooves 33 on edges adjacent to the inorganic board; a plurality of holes 34 is further provided on the frame; the axial direction of the hole is substantially perpendicular to the surface of the composite fireproof board; the frame is made of a PVC plastic plate, the inorganic fireproof material is a magnesite material, and the swallow-tailed grooves and the holes are also filled with the inorganic fireproof material;

an upper reinforcement mesh layer 4 made of glass fiber mesh and having a grid size of 5 mm*5 mm; and a surface layer 5 having a thickness of 0.5 mm and made of a magnesite material for preparing magnesite plates.

Embodiment 2

Figure 3:
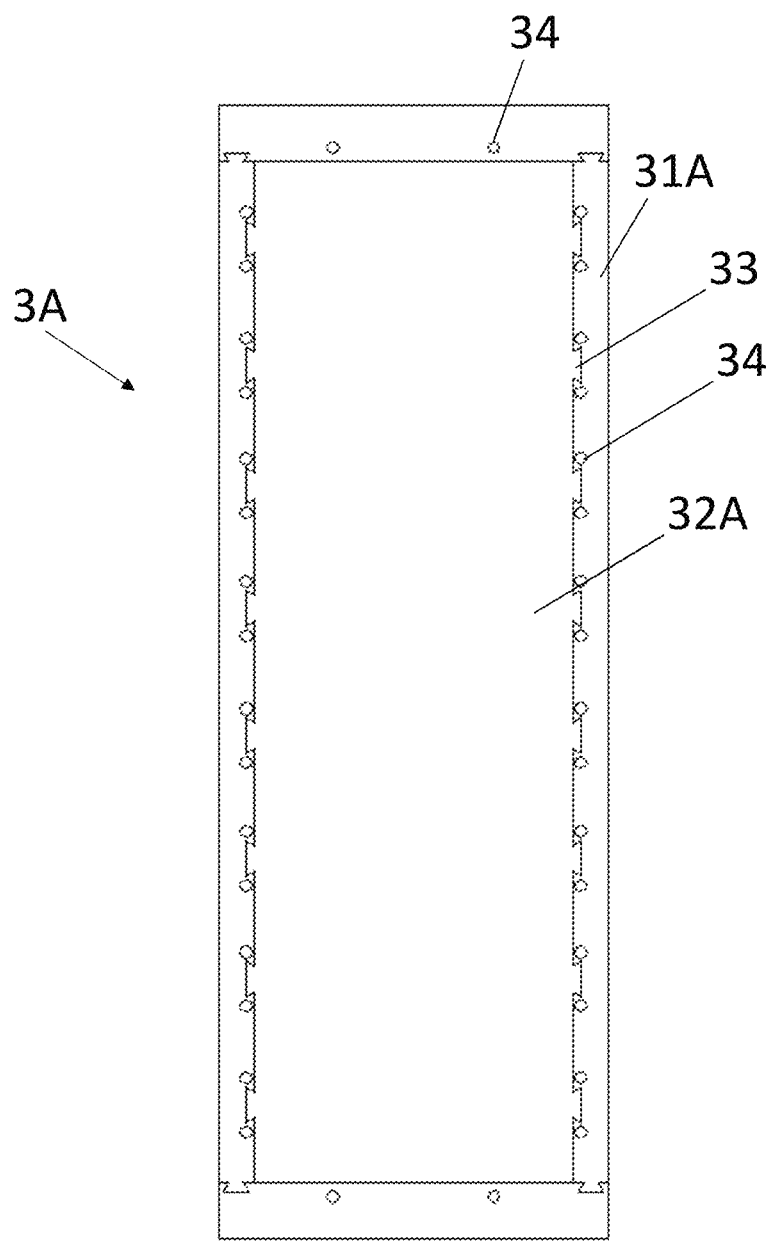
FIG. 3 is a schematic structural diagram of a middle layer in Embodiment 2.

As shown in FIG. 3, the present composite fireproof board easy for processing has a structure including, from bottom to top, a bottom layer having a thickness of 1.5 mm and made of a magnesium oxysulfide material for preparing magnesium oxysulfate plates;

a lower reinforcement mesh layer made of carbon fiber mesh and having a specification of 7 mm*7 mm;

a middle layer 3A having a thickness of 2 cm and consisting of a frame 31A and an inorganic fireproof material 32A filled within the frame, wherein the frame is formed by combining two long edges and two short edges; the length of the long edge is equal to the length of the composite fireproof board; the short edges are provided with swallow-tailed grooves at joints with the long edges; the long edges are provided with corresponding swallow-tailed bulges at corresponding positions; the frame is also provided with swallow-tailed grooves on edges adjacent to the inorganic board; a plurality of holes is further provided on the frame; the axial direction of the hole is substantially perpendicular to the surface of the composite fireproof board; the frame is made of an organic glass plate, the inorganic fireproof material is a magnesium oxysulfide material, and the swallow-tailed grooves and the holes are also filled with the inorganic fireproof material;

an upper reinforcement mesh layer made of carbon fiber mesh and having a grid size of 3 mm*3 mm; and a surface layer having a thickness of 1.5 mm and made of a magnesium oxysulfide material for preparing magnesium oxysulfate plates.

Embodiment 3

Figure 4:
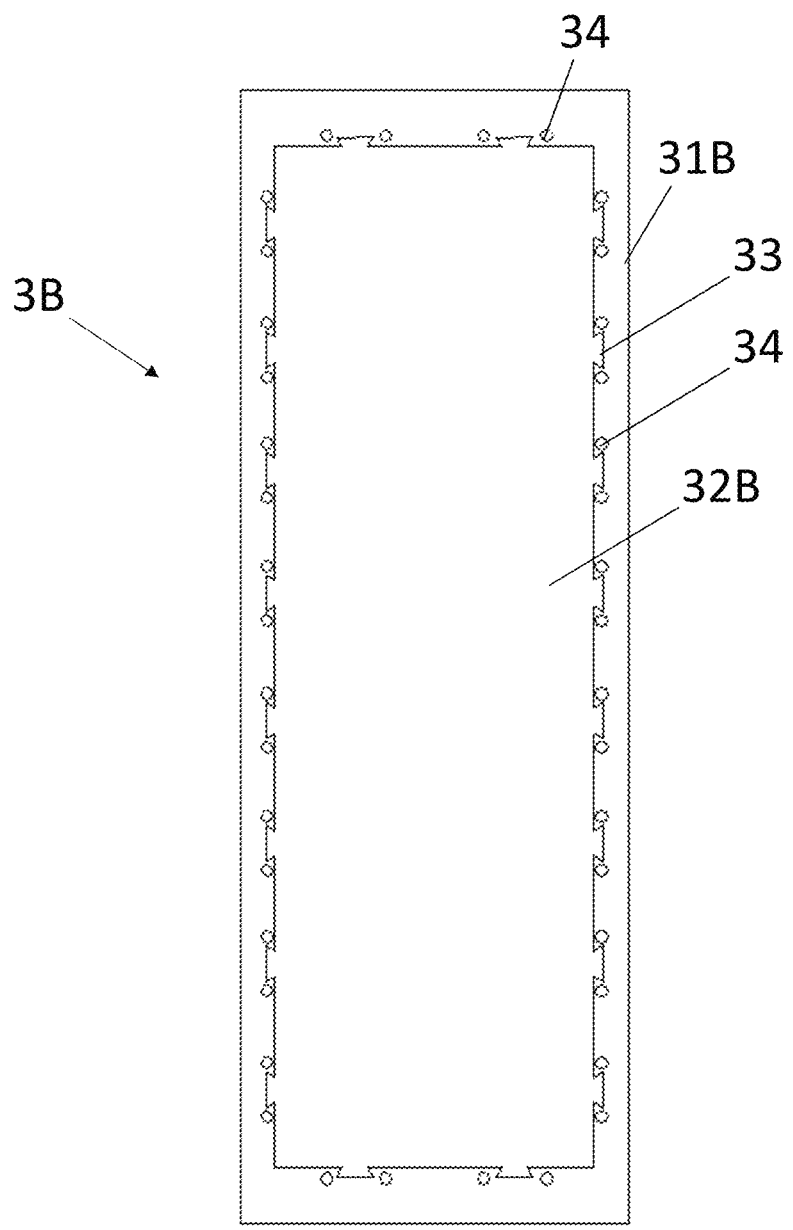
FIG. 4 is a schematic structural diagram of a middle layer in Embodiment 3.

As shown in FIG. 4, the present composite fireproof board easy for processing has a structure including, from bottom to top, a bottom layer having a thickness of 1.0 mm and made of a magnesium oxychloride material for preparing magnesium oxychloride plates;

a lower reinforcement mesh layer made of stainless steel metal wire mesh and having a grid size of 6 mm*6 mm, the diameter of the metal wire being 0.1 mm;

a middle layer 3B having a thickness of 1 cm and consisting of a frame 31B and an inorganic fireproof material 32B filled within the frame, wherein the frame is of an integral structure; the frame is provided with swallow-tailed grooves on edges adjacent to the inorganic board; a plurality of holes is further provided on the frame; the axial direction of the hole is substantially perpendicular to the surface of the composite fireproof board; the frame is made of a rubber plate, a bamboo plate, or a wood plate; the inorganic fireproof material is a magnesium oxychloride material, and the swallow-tailed grooves and the holes are also filled with the inorganic fireproof material;

an upper reinforcement mesh layer made of stainless steel metal wire mesh and having a grid size of 10 mm*10 mm, the diameter of the metal wire being 0.1 mm; and a surface layer having a thickness of 1.0 mm and made of a magnesium oxychloride material for preparing magnesium oxychloride plates.

Embodiment 4

Figure 5:
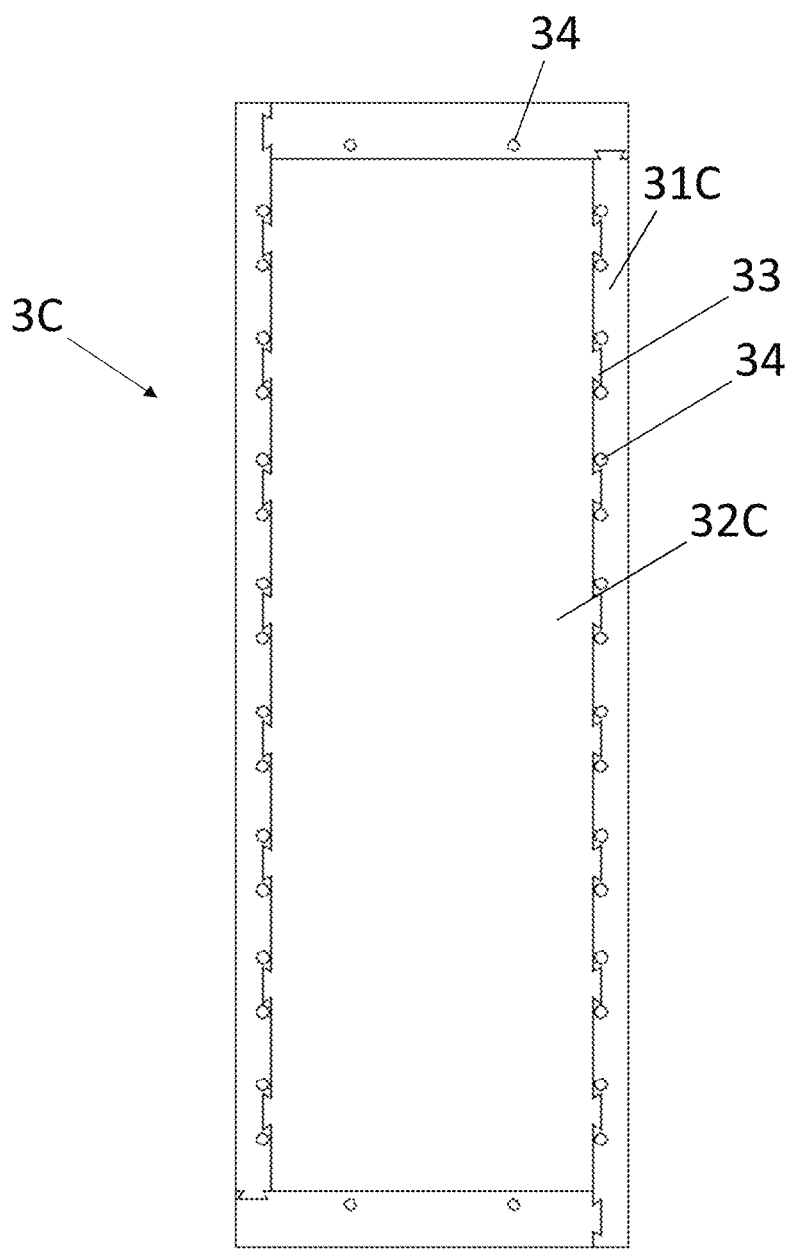
FIG. 5 is a schematic structural diagram of a middle layer in Embodiment 4.

As shown in FIG. 5, the present composite fireproof board easy for processing has a structure including, from bottom to top, a bottom layer having a thickness of 0.8 mm and made of cement for preparing cement boards;

a lower reinforcement mesh layer made of glass fiber mesh and having a specification of 5 mm*5 mm;

a middle layer 3C having a thickness of 1.5 cm and consisting of a frame 31C and an inorganic fireproof material 32C filled within the frame, wherein the frame is formed by combining two long edges and two short edges; the long edges and the short edges are connected to one another; swallow-tailed grooves and corresponding swallow-tailed bulges are provided at joints between the long edges and the short edges; the frame is also provided with swallow-tailed grooves on edges adjacent to the inorganic board; a plurality of holes is further provided on the frame; the axial direction of the hole is substantially perpendicular to the surface of the composite fireproof board; the frame is made of a wood plate, the inorganic fireproof material is cement, and the swallow-tailed grooves and the holes are also filled with the inorganic fireproof material;

an upper reinforcement mesh layer made of plastic mesh, the plastic mesh being made of nylon yarn and having a grid size of 6 mm*6 mm; and a surface layer having a thickness of 1.0 mm and made of cement for preparing cement boards.

Embodiment 5

Figure 6:
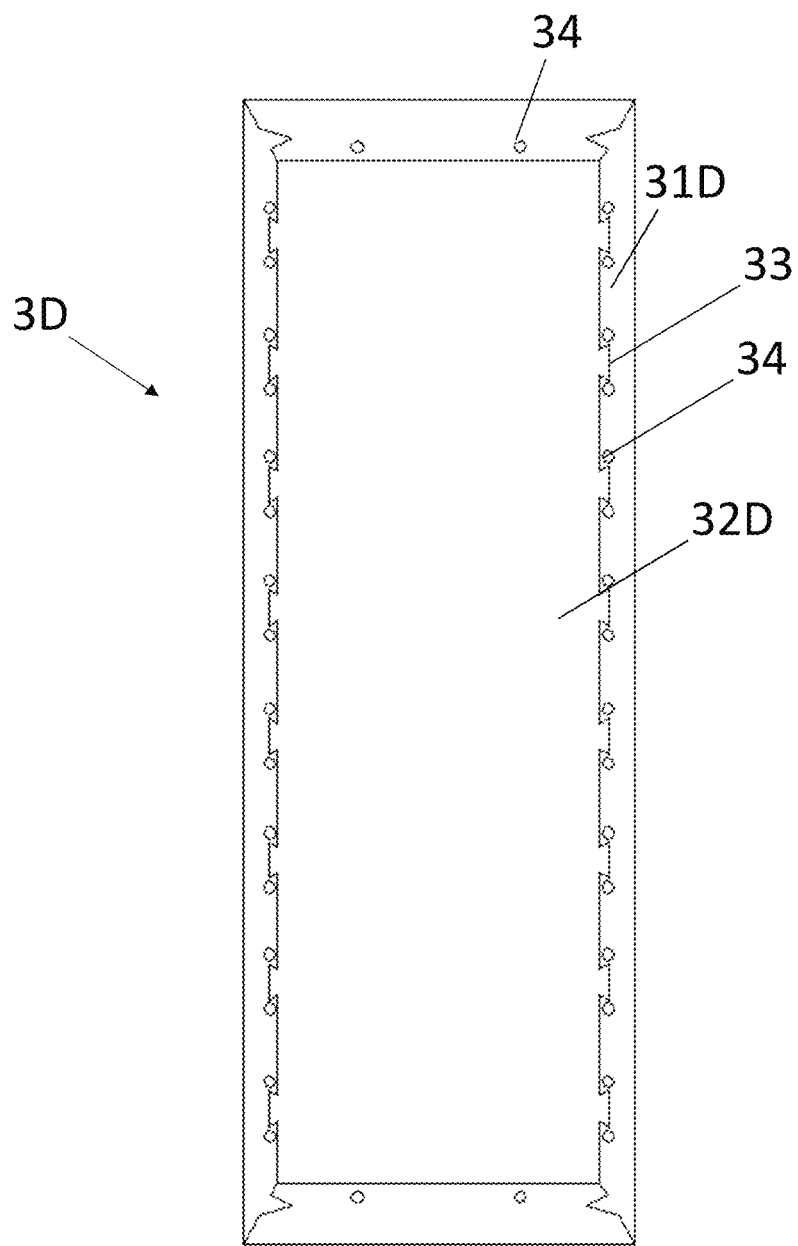
FIG. 6 is a schematic structural diagram of a middle layer in Embodiment 5.

As shown in FIG. 6, the present composite fireproof board easy for processing has a structure including, from bottom to top, a bottom layer having a thickness of 1.2 mm and made of a calcium silicate material for preparing calcium silicate plates;

a lower reinforcement mesh layer made of glass fiber mesh and having a specification of 5 mm*5 mm;

a middle layer 3D having a thickness of 1.2 cm and consisting of a frame 31D and an inorganic fireproof material 32D filled within the frame, wherein the frame is formed by combining two long edges and two short edges; grooves and corresponding bulges are provided at joints between the long edges and the short edges, to fixedly connect the long edges with the short edges; the frame is also provided with swallow-tailed grooves on edges adjacent to the inorganic board; a plurality of holes is further provided on the frame; the axial direction of the hole is substantially perpendicular to the surface of the composite fireproof board; the frame is made of a bamboo plate, the inorganic fireproof material is a calcium silicate material, and the swallow-tailed grooves and the holes are also filled with the inorganic fireproof material;

an upper reinforcement mesh layer made of glass fiber mesh and having a grid size of 7 mm*7 mm; and a surface layer having a thickness of 1.0 mm and made of a magnesite material for preparing magnesite plates.

Embodiment 6

Figure 7:
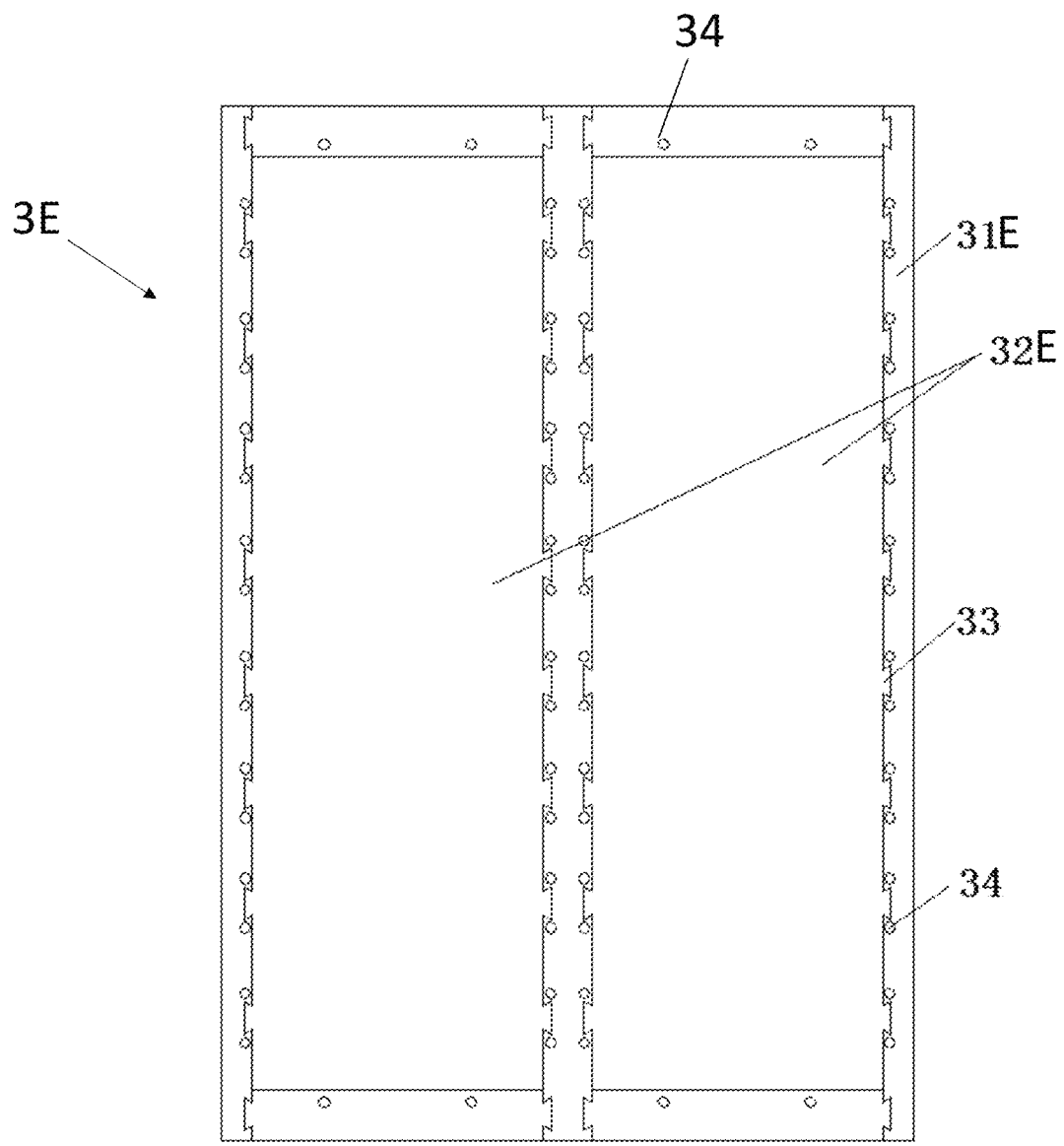
FIG. 7 is a schematic structural diagram of a middle layer in Embodiment 6.
Figure 8:
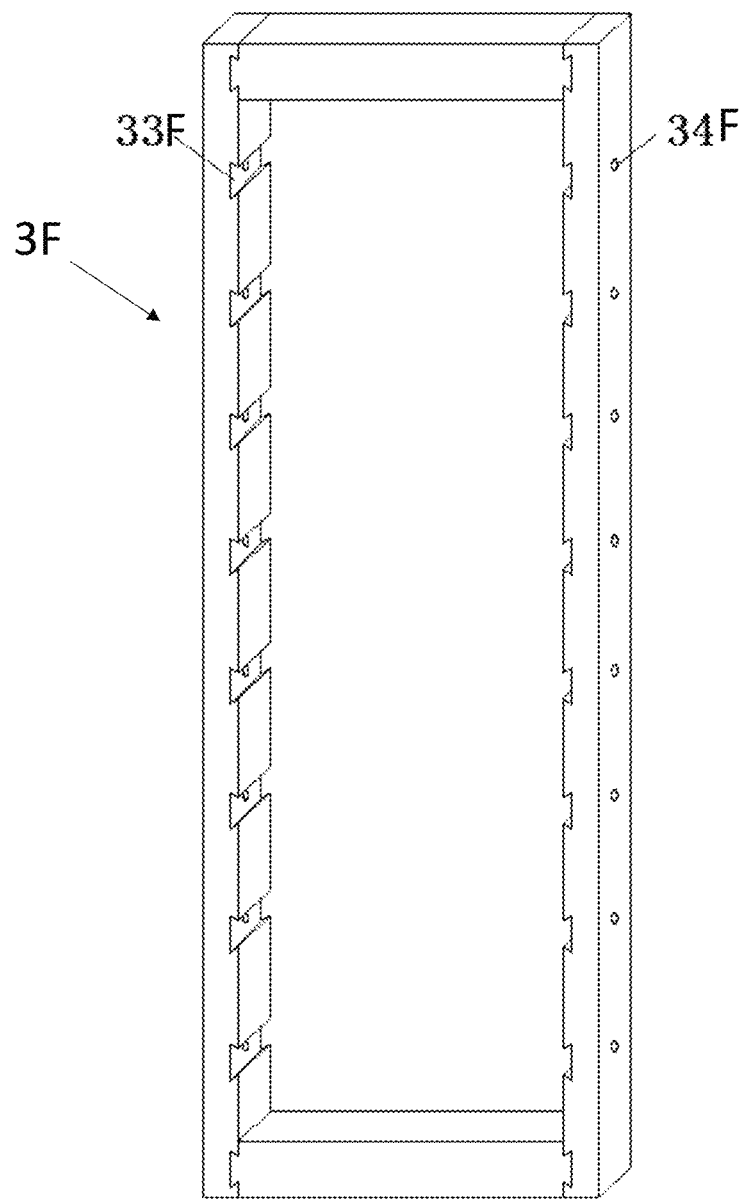
FIG. 8 is a schematic structural diagram of a middle layer in Embodiment 7.
Figure 9:
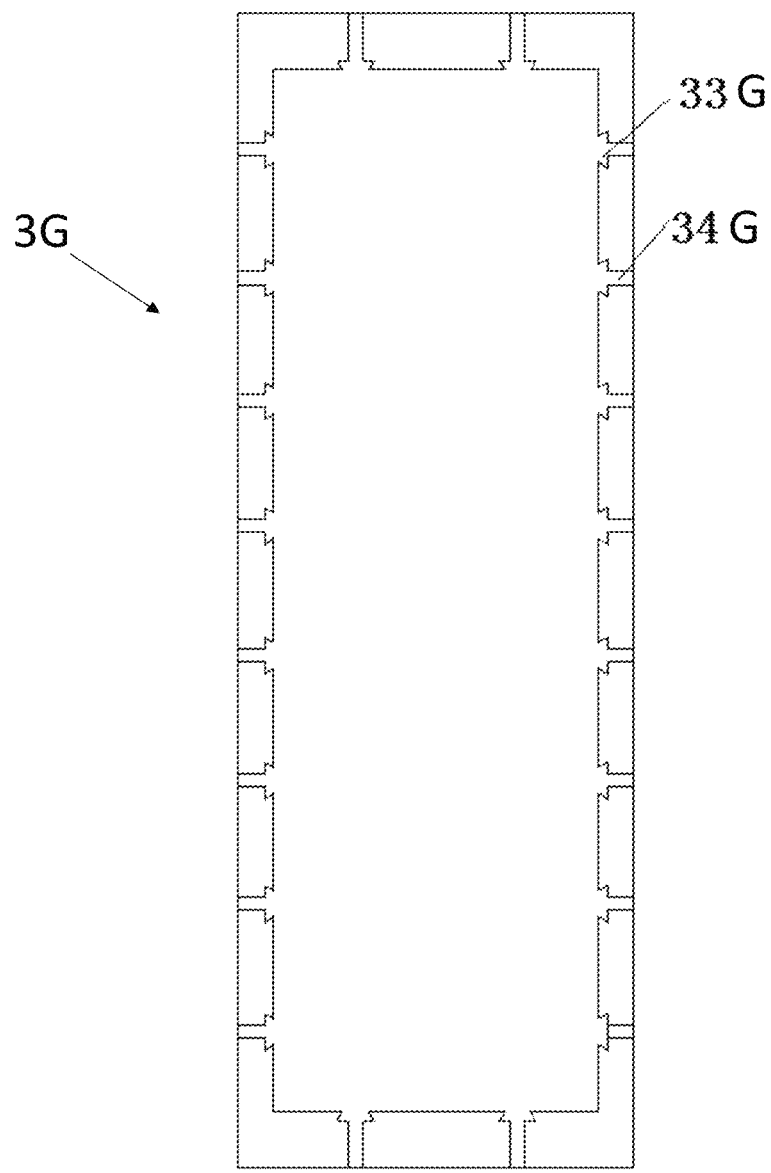
FIG. 9 is a schematic structural diagram of a middle layer in Embodiment 8.
Figure 10:
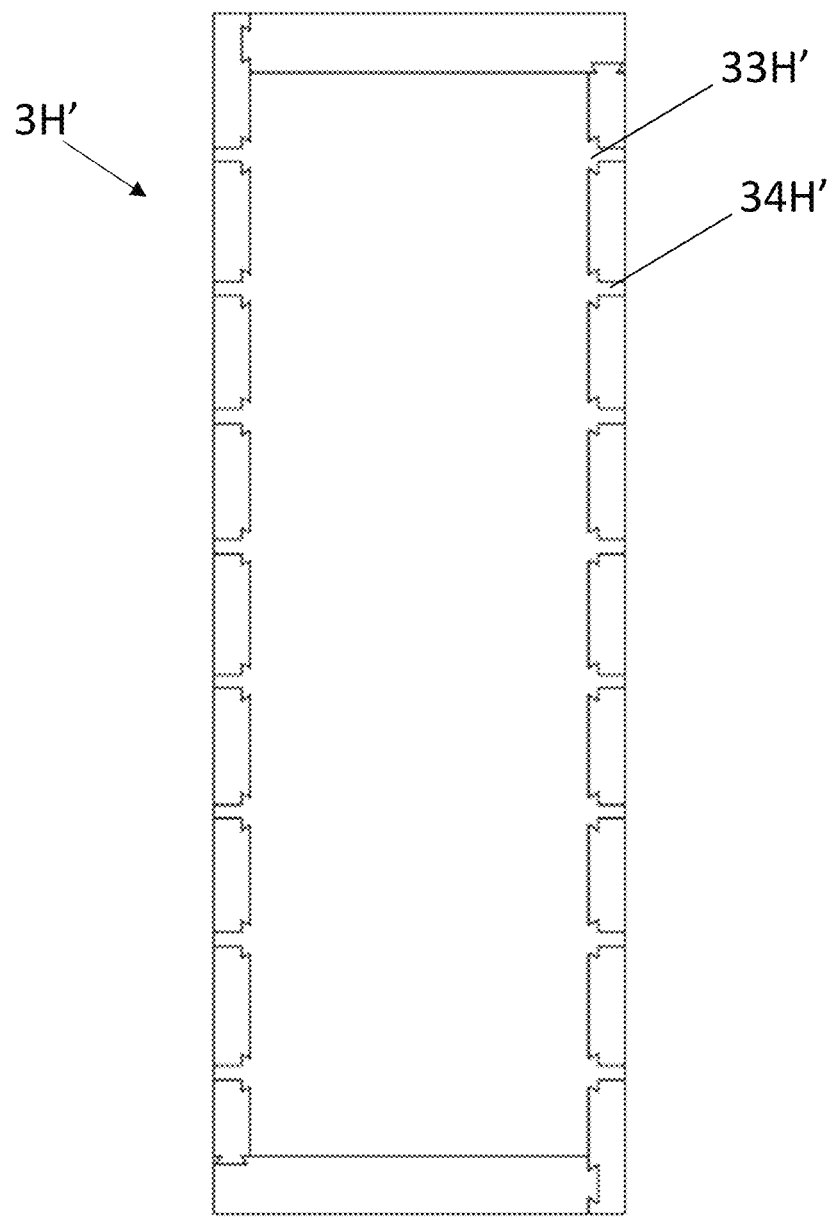
FIG. 10 is a schematic structural diagram of a middle layer in Embodiment 9.
Figure 11:
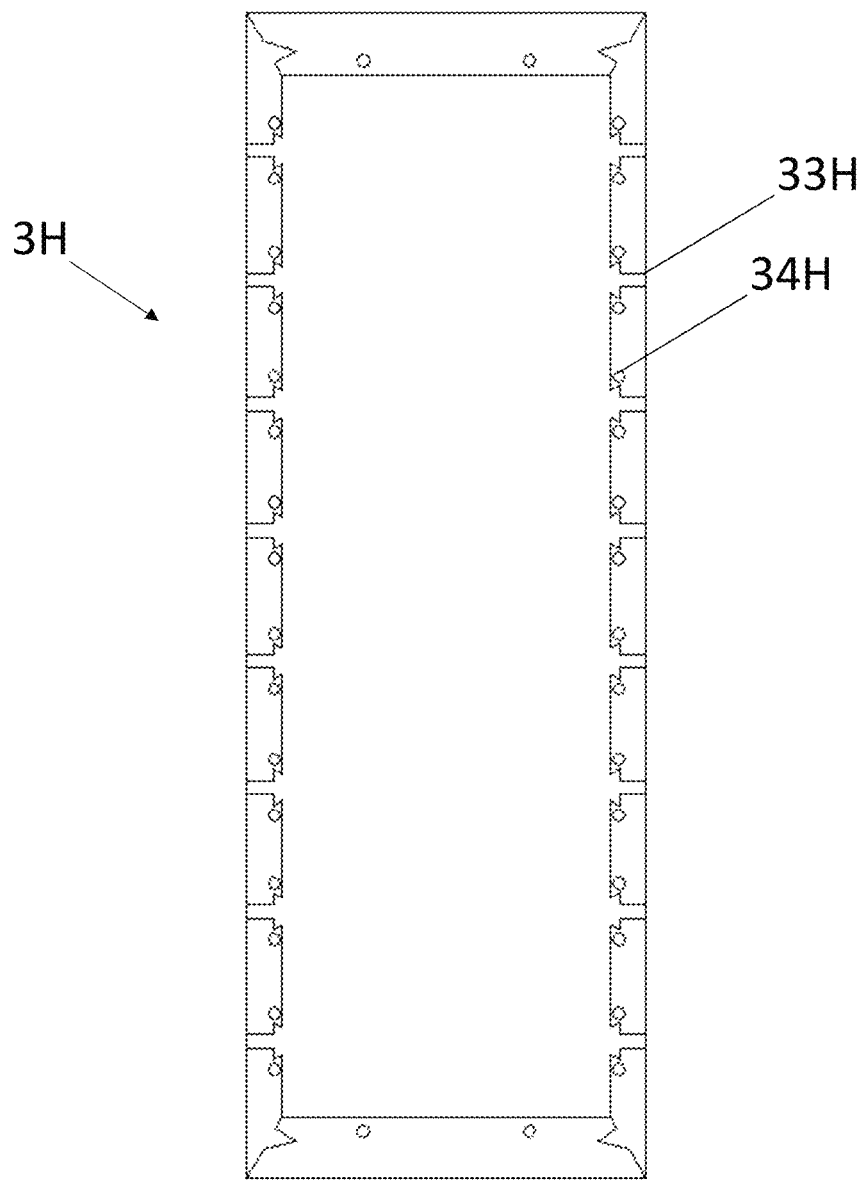
FIG. 11 is a schematic structural diagram of a middle layer in Embodiment 10.

As shown in FIG. 7, the present composite fireproof board easy for processing has a structure including, from bottom to top, a bottom layer having a thickness of 0.5 mm and a magnesite material for preparing magnesite plates;

a lower reinforcement mesh layer made of glass fiber mesh and having a specification of 5 mm*5 mm;

a middle layer 3E having a thickness of 3 mm and consisting of a frame 31E and an inorganic fireproof material 32E filled within the frame, wherein the frame is formed by connecting three long edges and four short edges; the length of the long edge is equal to the length of the composite fireproof board, and two spaces for accommodating the inorganic board are formed within the long edges; the long edges are provided with swallow-tailed grooves 33 at joints with the short edges; the short edges are provided with corresponding swallow-tailed bulges at corresponding positions; the long edges and the short edges are fixedly connected through the swallow-tailed grooves and the swallow-tailed bulges; the frame is also provided with swallow-tailed grooves 33 on edges adjacent to the inorganic board; a plurality of holes 34 is further provided on the frame; the axial direction of the hole is substantially perpendicular to the surface of the composite fireproof board; the frame is made of a PVC plastic plate, the inorganic fireproof material is a magnesium oxysulfide material, and the swallow-tailed grooves and the holes are also filled with the inorganic fireproof material;

an upper reinforcement mesh layer made of glass fiber mesh and having a grid size of 5 mm*5 mm; and a surface layer having a thickness of 0.5 mm and made of a magnesite material for preparing magnesite plates.

Embodiment 7

The structure of this embodiment is substantially the same as that in Embodiment 1, except that the holes 34F in the middle layer 3F are provided in the swallow-tailed grooves 33F, and the axial direction of the hole is substantially parallel to the surface of the composite fireproof board.

Embodiment 8

The structure of this embodiment is substantially the same as that in Embodiment 3, except that the holes 34G in the middle layer 3G are provided in the swallow-tailed grooves 33G, and the axial direction of the hole is substantially parallel to the surface of the composite fireproof board.

Embodiment 9

The structure of this embodiment is substantially the same as that in Embodiment 4, except that the holes 34H' in the middle layer 3H' are provided in the swallow-tailed grooves 33H', and the axial direction of the hole is substantially parallel to the surface of the composite fireproof board.

Embodiment 10

The structure of this embodiment is substantially the same as that in Embodiment 5, except that in addition to the holes provided on the frame and having an axial direction substantially perpendicular to the surface of the composite fireproof board, holes 34H in the middle layer 3H having an axial direction substantially perpendicular to the surface of the composite fireproof board are also provided in the swallow-tailed grooves 33H.

Embodiment 11

The present composite fireproof board easy for processing has a structure including, from bottom to top, a bottom layer having a thickness of 115.5 mm and made of a magnesium oxysulfide material for preparing magnesium oxysulfate plates;

a lower reinforcement mesh layer made of carbon fiber mesh and having a specification of 7 mm*7 mm;

a middle layer having a thickness of 300 mm and consisting of a frame and an inorganic fireproof material filled within the frame, wherein the frame is formed by combining two long edges and two short edges; the length of the short edge is equal to the width of the composite fireproof board; the short edges are provided with swallow-tailed grooves at joints with the long edges; the long edges are provided with corresponding swallow-tailed bulges at corresponding positions; the frame is also provided with swallow-tailed grooves on edges adjacent to the inorganic board; a plurality of holes is further provided on the frame; the axial direction of the hole is substantially perpendicular to the surface of the composite fireproof board; the frame is made of an organic glass plate, and the inorganic fireproof material is a magnesium oxysulfide material;

an upper reinforcement mesh layer made of carbon fiber mesh and having a grid size of 3 mm*3 mm; and a surface layer having a thickness of 15.5 mm and made of a magnesium oxysulfate plate.

Embodiment 12

The present composite fireproof board easy for processing has a structure including, from bottom to top, a balancer layer having a thickness of 4 mm and made of foamed plastic;

a bottom layer having a thickness of 5.0 mm and made of a magnesium oxysulfide material for preparing magnesium oxysulfate plates;

a lower reinforcement mesh layer made of glass fiber mesh and having a specification of 5 mm*5 mm;

a middle layer having a thickness of 50 mm and consisting of a frame and an inorganic fireproof material filled within the frame, wherein the frame is formed by combining two long edges and two short edges; joints between the long edges and the short edges are wedge-shaped; grooves and corresponding bulges are provided at the joints between the long edges and the short edges to fixedly connect the long edges with the short edges; the frame is also provided with swallow-tailed grooves on edges adjacent to the inorganic board; a plurality of holes is further provided on the frame; the axial direction of the hole is substantially perpendicular to the surface of the composite fireproof board; the frame is made of a high-density PVC plastic plate, and the inorganic fireproof material is a magnesium oxysulfide material;

an upper reinforcement mesh layer 4 made of glass fiber mesh and having a grid size of 7 mm*7 mm;

a surface layer having a thickness of 3.0 mm and made of a magnesium oxysulfate plate; and a skin layer having a thickness of 5.0 mm and made of impregnated paper.

Embodiment 13

The present composite fireproof board easy for processing has a structure substantially the same as that in Embodiment 12, except that the balancer layer is made of cork, and the skin layer is made of a bamboo plate.

Embodiment 14

The present composite fireproof board easy for processing has a structure substantially the same as that in Embodiment 12, except that the balancer layer is made of a bamboo plate, and the skin layer is made of a plastic film.

Embodiment 15

The present composite fireproof board easy for processing has a structure substantially the same as that in Embodiment 12, except that the balancer layer is made of a wood plate, and the skin layer is made of a carpet.

Embodiment 16

The present composite fireproof board easy for processing has a structure substantially the same as that in Embodiment 12, except that the balancer layer is made of impregnated paper, and the skin layer is made of a high-density PVC plastic plate.

Embodiment 17

The present composite fireproof board easy for processing has a structure substantially the same as that in Embodiment 12, except that the balancer layer is made of a wood plate, and the skin layer is made of an aluminum alloy plate.

Embodiment 18

The present composite fireproof board easy for processing has a structure substantially the same as that in Embodiment 12, except that the balancer layer is made of cork, and the skin layer is made of ceramic tiles.

Embodiment 19

The present composite fireproof board easy for processing has a structure substantially the same as that in Embodiment 12, except that the balancer layer is made of foamed plastic, and the skin layer is made of leather.

Embodiment 20

The present composite fireproof board easy for processing has a structure substantially the same as that in Embodiment 12, except that the balancer layer is made of impregnated paper, and the skin layer is made of a wood plate.

Embodiment 21

The present composite fireproof board easy for processing has a structure substantially the same as that in Embodiment 12, except that the balancer layer is not provided, and the skin layer is made of cork.

Embodiment 22

The present preparation method of a composite fireproof board easy for processing includes steps of:
(1) preparing a frame, and forming swallow-tailed grooves and holes on the frame through processing;
(2) preparing a mushy magnesium oxysulfide material, laying the material on a template, flattening the material into a bottom layer, wherein during preparation of the magnesium oxysulfide material, a modifier is added at a ratio of 15:1 and bamboo powder is added at a ratio of 20:1; the modifier has the following formula: dispersant NNO, trisodium phosphate, and ferric chloride that are evenly mixed at a ratio of 1:1:1, and a finally formed magnesium oxysulfate plate has a crystalline phase of $5Mg(OH)_2 \cdot 1MgSO_4 \cdot 7H_2O$;
(3) laying glass fiber mesh on the bottom layer;
(4) placing the frame on the lower reinforcement mesh layer, injecting the mushy magnesium oxysulfide material into the frame, flattening, and filling the inorganic material into the whole frame as well as in the swallow-tailed grooves and the holes, to form a middle layer, wherein
during preparation of the magnesium oxysulfide material, a modifier is added at a ratio of 15:1 and bamboo powder is added at a ratio of 100:11; the modifier has the following formula: dispersant NNO, trisodium phosphate, and ferric chloride that are evenly mixed at a ratio of 1:1:1; a finally formed magnesium oxysulfate plate has a crystalline phase of $5Mg(OH)2 \cdot 1MgSO4 \cdot 7H2O$; the middle layer is reinforced with bamboo fiber, thereby effectively enhance the strength and toughness thereof and preventing brittle failure of the composite board; the middle layer may also be reinforced with wood fiber, glass fiber, and other fibers;
(5) laying glass fiber mesh on the middle layer before the board of the middle layer is cured;
(6) injecting a layer of the mushy magnesium oxysulfide material on the upper reinforcement mesh layer, and flattening to form a surface layer, wherein during allocation of the magnesium oxysulfide material, a modifier is added at a ratio of 15:1 and bamboo powder is added at a ratio of 20:1; the modifier has the following formula: dispersant NNO, trisodium phosphate, and ferric chloride that are evenly mixed at a ratio of 1:1:1; a finally formed magnesium oxysulfate plate has a crystalline phase of $5Mg(OH)2 \cdot 1MgSO4 \cdot 7H2O$; the surface layer is relatively light and thin and has its surface polished such that other materials, such as a wood plate or a high-density resin sheet, can be attached to the surface thereof; and
(7) performing natural leveling, curing for 48 h in a curing kiln, demoulding, and placing into a maintenance kiln to keep maintenance for 7-28 days.

Embodiment 23

The present preparation method of a composite fireproof board easy for processing includes steps of:
(1) preparing a frame, and forming swallow-tailed grooves and holes on the frame through processing;
(2) allocating a mushy magnesium oxychloride material, laying the material on a template, flattening the material into a bottom layer, wherein a formed magnesium oxysulfate plate has a crystalline phase of $5Mg(OH)_2 \cdot 1MgCl_2 \cdot 8H_2O$; during preparation, a modifier is added at a ratio of 15:1 and wood powder is added at a ratio of 18:1; the modifier has the following formula: dispersant NNO, trisodium phosphate, and ferric chloride that are evenly mixed at a ratio of 1:1:1;
(3) laying glass fiber mesh on the bottom layer before the bottom layer is cured;
(4) placing the frame on the lower reinforcement mesh layer, injecting the mushy magnesium oxychloride material into the frame, flattening, and filling the inorganic material into the whole frame as well as in the swallow-tailed grooves and the holes to form a middle layer, wherein a formed magnesium oxychloride plate has a crystalline phase of $5Mg(OH)_2 \cdot 1MgCl_2 \cdot 8H_2O$, and wood powder is added at a ratio of 10:1, the fineness of the wood powder being 40 meshes;
(5) laying glass fiber mesh on the middle layer before the board of the middle layer is cured;
(6) injecting a layer of the mushy magnesium oxychloride material on the upper reinforcement mesh layer, and flattening to form a surface layer, wherein a finally formed magnesium oxychloride plate having a crystalline phase of 5Mg (OH)2.1MgCl$_2$.8H$_2$O; and (7) hot-pressing at 150 degrees in a 2000 t hot press for 6 min, demoulding, and placing into a maintenance kiln to keep maintenance for 7 days.

Embodiment 24

Figure 12:
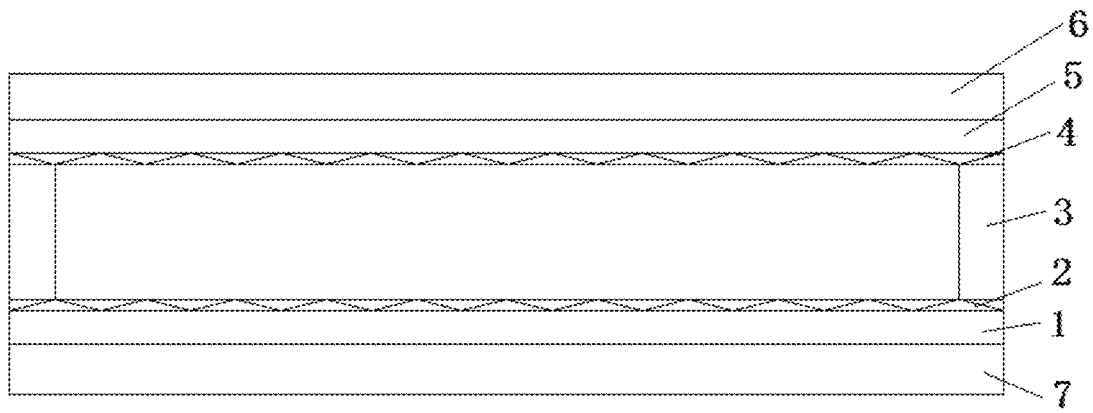
FIG. 12 is a schematic structural diagram of a composite fireproof floor easy for processing of Embodiment 24.

As shown in FIG. 12, the present composite fireproof floor easy for processing has a structure including, from bottom to top, a balancer layer 7 having a thickness of 3 mm and made of foamed plastic;

a bottom layer 1 having a thickness of 1.2 mm and made of a magnesium oxysulfide material for preparing magnesium oxysulfate plates;

a lower reinforcement mesh layer 2 made of glass fiber mesh and having a specification of 5 mm*5 mm;

a middle layer 3 having a thickness of 12 mm and consisting of a frame and an inorganic fireproof material filled within the frame, wherein the frame is formed by combining two long edges and two short edges; joints between the long edges and the short edges are wedge-shaped; grooves and corresponding bulges are provided at the joints between the long edges and the short edges to fixedly connect the long edges with the short edges; the frame is also provided with swallow-tailed grooves on edges adjacent to the inorganic board; a plurality of holes is further provided on the frame; the axial direction of the hole is substantially perpendicular to the surface of the composite fireproof board; the frame is made of a high-density PVC plastic plate, and the inorganic fireproof material is a magnesium oxysulfide material;

an upper reinforcement mesh layer 4 made of glass fiber mesh and having a grid size of 7 mm*7 mm;

a surface layer 5 having a thickness of 1.5 mm and made of a magnesium oxysulfate plate; and a skin layer 6 having a thickness of 1.0 mm and made of impregnated paper.

Embodiment 25

Figure 13:
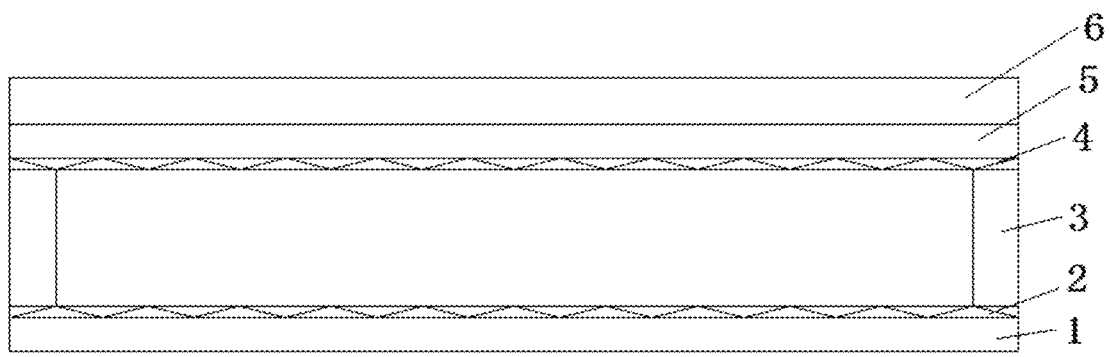
FIG. 13 is a schematic structural diagram of a composite fireproof floor easy for processing of Embodiment 25.

As shown in FIG. 13, the present composite fireproof floor easy for processing has a structure including, from bottom to top, a bottom layer 1 having a thickness of 1.2 mm and made of a magnesium oxychloride material for preparing magnesium oxychloride plates;

a lower reinforcement mesh layer 2 made of glass fiber mesh and having a specification of 5 mm*5 mm;

a middle layer having a thickness of 20 mm and consisting of a frame and an inorganic fireproof material filled within the frame, wherein the frame is formed by combining two long edges and two short edges; the length of the short edge is equal to the width of the composite fireproof board; the short edges are provided with swallow-tailed grooves at joints with the long edges; the long edges are provided with corresponding swallow-tailed bulges at corresponding positions; the frame is also provided with swallow-tailed grooves on edges adjacent to the inorganic board; a plurality of holes is further provided on the frame; the axial direction of the hole is substantially perpendicular to the surface of the composite fireproof board; the frame is made of a wood plate, and the inorganic fireproof material is a magnesium oxychloride material;

an upper reinforcement mesh layer 4 made of glass fiber mesh and having a grid size of 7 mm*7 mm;

a surface layer 5 having a thickness of 1.0 mm and made of a magnesium oxychloride plate; and a skin layer 6 having a thickness of 2.0 mm and made of a wood plate.

Embodiment 26

The present composite fireproof floor easy for processing has a structure substantially the same as that in Embodiment 24, except that the balancer layer is made of cork, and the skin layer is made of a bamboo plate.

Embodiment 27

The present composite fireproof floor easy for processing has a structure substantially the same as that in Embodiment 24, except that the balancer layer is made of a bamboo plate, and the skin layer is made of a plastic film.

Embodiment 28

The present composite fireproof floor easy for processing has a structure substantially the same as that in Embodiment 24, except that the balancer layer is made of a wood plate, and the skin layer is made of impregnated paper.

Embodiment 29

The present composite fireproof floor easy for processing has a structure substantially the same as that in Embodiment 24, except that the balancer layer is made of impregnated paper, and the skin layer is made of a carpet.

Embodiment 30

The present composite fireproof floor easy for processing has a structure substantially the same as that in Embodiment 24, except that the balancer layer is made of a wood plate, and the skin layer is made of an aluminum alloy plate.

Embodiment 31

The present composite fireproof floor easy for processing has a structure substantially the same as that in Embodiment 24, except that the balancer layer is made of cork, and the skin layer is made of ceramic tiles.

Embodiment 32

The present composite fireproof floor easy for processing has a structure substantially the same as that in Embodiment 24, except that the balancer layer is made of foamed plastic, and the skin layer is made of leather.

Embodiment 33

The present composite fireproof board easy for processing has a structure substantially the same as that in Embodiment 24, except that the balancer layer is made of impregnated paper, and the skin layer is made of cork.

Embodiment 34

The present composite fireproof floor easy for processing has a structure substantially the same as that in Embodiment 24, except that the balancer layer is not provided, and the skin layer is made of a high-density PVC plastic plate.

Embodiment 35

The present composite fireproof wallboard easy for processing has a structure including, from bottom to top, a balancer layer having a thickness of 5 mm and made of foamed plastic;

a bottom layer having a thickness of 12 mm and made of a magnesium oxysulfide material for preparing magnesium oxysulfate plates;

a lower reinforcement mesh layer made of glass fiber mesh and having a specification of 5 mm*5 mm;

a middle layer having a thickness of 150 mm and consisting of a frame and an inorganic fireproof material filled within the frame, wherein the frame is formed by combining two long edges and two short edges; joints between the long edges and the short edges are wedge-shaped; grooves and corresponding bulges are provided at the joints between the long edges and the short edges to fixedly connect the long edges with the short edges; the frame is also provided with swallow-tailed grooves on edges adjacent to the inorganic board; a plurality of holes is further provided on the frame; the axial direction of the hole is substantially perpendicular to the surface of the composite fireproof board; the frame is made of a high-density PVC plastic plate, and the inorganic fireproof material is a magnesium oxysulfide material;

an upper reinforcement mesh layer 4 made of glass fiber mesh and having a grid size of 7 mm*7 mm;

a surface layer having a thickness of 8.0 mm and made of a magnesium oxysulfate plate; and a skin layer having a thickness of 3.0 mm and made of impregnated paper.

Embodiment 36

The present composite fireproof wallboard easy for processing has a structure substantially the same as that in Embodiment 35, except that the balancer layer is made of cork, and the skin layer is made of a bamboo plate.

Embodiment 37

The present composite fireproof wallboard easy for processing has a structure substantially the same as that in Embodiment 35, except that the balancer layer is made of a wood plate, and the skin layer is made of a plastic film.

Embodiment 38

The present composite fireproof wallboard easy for processing has a structure substantially the same as that in Embodiment 35, except that the balancer layer is made of a bamboo plate, and the skin layer is made of a carpet.

Embodiment 39

The present composite fireproof wallboard easy for processing has a structure substantially the same as that in Embodiment 35, except that the balancer layer is made of impregnated paper, and the skin layer is made of a high-density PVC plastic plate.

Embodiment 40

The present composite fireproof wallboard easy for processing has a structure substantially the same as that in Embodiment 35, except that the balancer layer is made of cork, and the skin layer is made of an aluminum alloy plate.

Embodiment 41

The present composite fireproof wallboard easy for processing has a structure substantially the same as that in Embodiment 35, except that the balancer layer is made of a wood plate, and the skin layer is made of ceramic tiles.

Embodiment 42

The present composite fireproof wallboard easy for processing has a structure substantially the same as that in Embodiment 35, except that the balancer layer is made of impregnated paper, and the skin layer is made of leather.

Embodiment 43

The present composite fireproof wallboard easy for processing has a structure substantially the same as that in Embodiment 35, except that the balancer layer is made of foamed plastic, and the skin layer is made of cork.

Embodiment 44

The present composite fireproof wallboard easy for processing has a structure substantially the same as that in Embodiment 35, except that the balancer layer is made of cork, and the skin layer is made of a wood plate.

Embodiment 45

The present composite fireproof wallboard easy for processing has a structure substantially the same as that in Embodiment 35, except that the balancer layer is not provided, and the skin layer is made of a wood plate.

Embodiment 46

Figure 14:
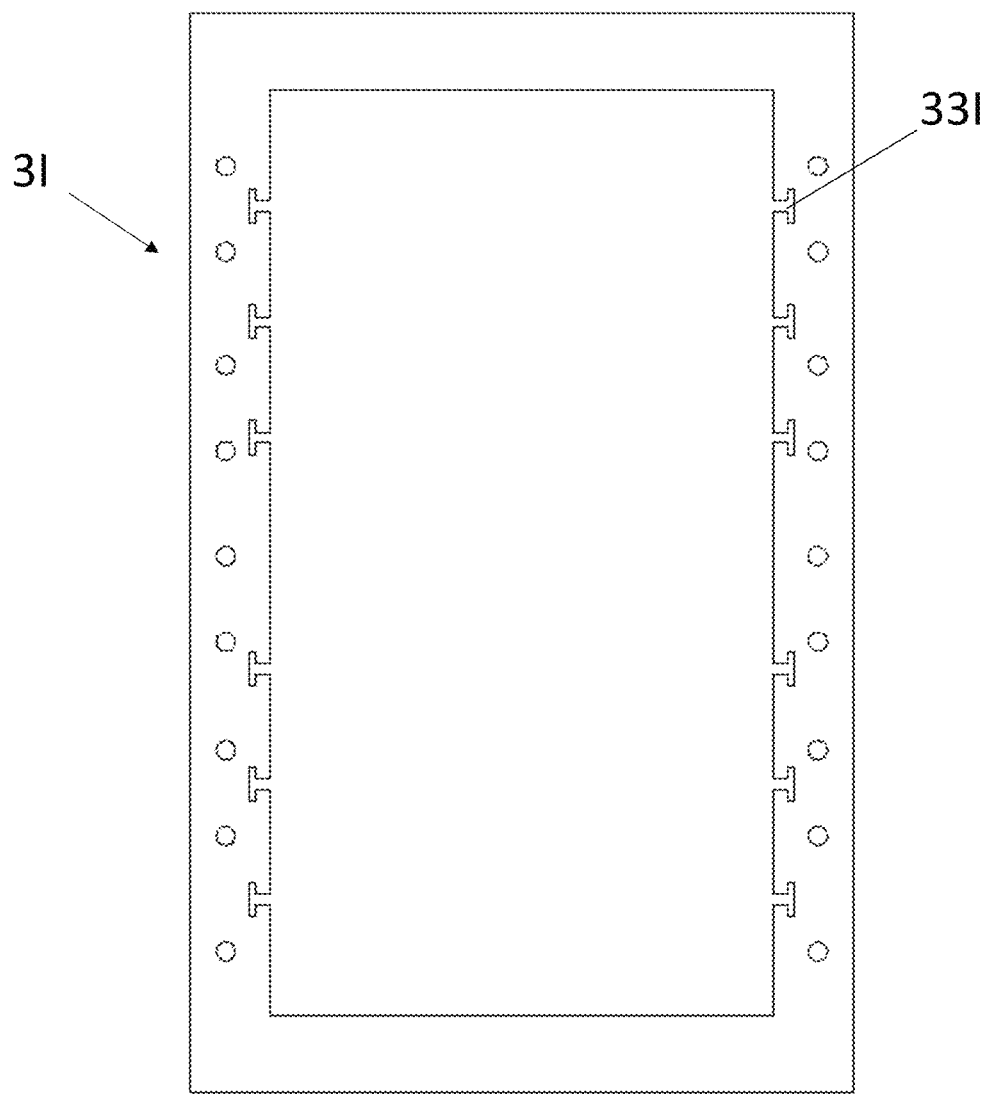
FIG. 14 is a schematic structural diagram of a middle layer in Embodiment 46.

As shown in FIG. 14, the present composite fireproof board easy for processing has a structure substantially the same as that in Embodiment 3, except that the fixed grooves of the middle layer 3I are T-shaped grooves 33I.

Embodiment 47

Figure 15:
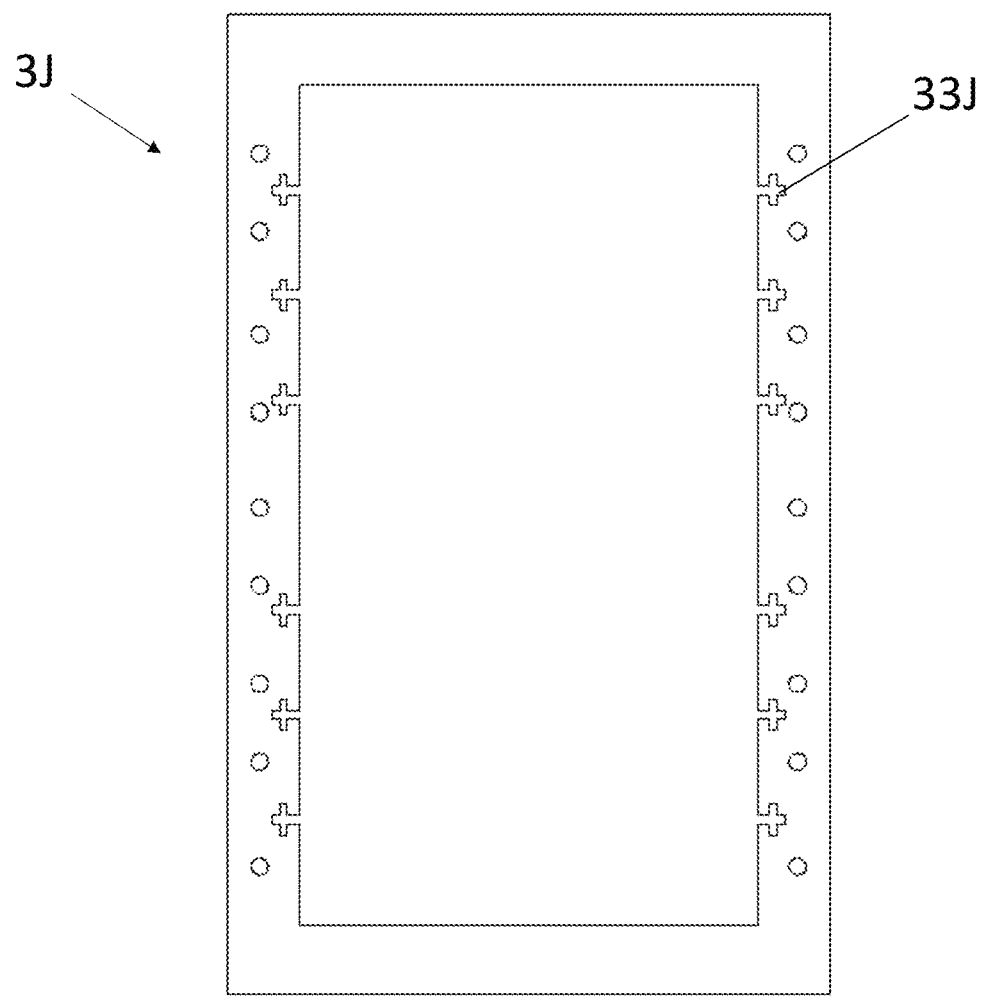
FIG. 15 is a schematic structural diagram of a middle layer in Embodiment 47.

As shown in FIG. 15, the present composite fireproof board easy for processing has a structure substantially the same as that in Embodiment 3, except that the fixed grooves of the middle layer 3J are cross grooves 33J.

Embodiment 48

The present composite fireproof board easy for processing has a structure substantially the same as that in Embodiment 2, except that the frame is made of a stone plastic material.

Embodiment 49

The present composite fireproof board easy for processing has a structure substantially the same as that in Embodiment 3, except that the frame is made of a wood plastic material.

Embodiment 50

The present composite fireproof board easy for processing has a structure substantially the same as that in Embodiment 12, except that the balancer layer is made of cork, and the skin layer is made of a stone plastic plate.

Embodiment 51

The present composite fireproof board easy for processing has a structure substantially the same as that in Embodiment 12, except that the balancer layer is made of impregnated paper, and the skin layer is made of a wood plastic plate.

Embodiment 52

The present composite fireproof floor easy for processing has a structure substantially the same as that in Embodiment 24, except that the balancer layer is made of foamed plastic, and the skin layer is made of a stone plastic plate.

Embodiment 53

The present composite fireproof floor easy for processing has a structure substantially the same as that in Embodiment 24, except that the balancer layer is made of a wood plate, and the skin layer is made of a wood plastic plate.

Embodiment 54

The present composite fireproof wallboard easy for processing has a structure substantially the same as that in Embodiment 35, except that the balancer layer is made of impregnated paper, and the skin layer is made of a stone plastic plate.

Embodiment 55

The present composite fireproof wallboard easy for processing has a structure substantially the same as that in Embodiment 35, except that the balancer layer is made of foamed plastic, and the skin layer is made of a wood plastic plate.

What is claimed is:

1. A composite fireproof board comprising a structure, the structure comprising, from bottom to top, a bottom layer, a lower reinforcement mesh layer, a middle layer, an upper reinforcement mesh layer, and a surface layer, wherein the middle layer comprises a frame and an inorganic fireproof material filled within the frame, the frame is made of an organic material, the frame comprises a plurality of first spaced apart edges and a plurality of second spaced apart edges, the second spaced apart edges extend between the first spaced apart edges to define the frame, one of (i) each of the plurality of first edges and (ii) each of the plurality of second edges including second edge grooves, and the other of (i) each of the plurality of first edges and (ii) each of the plurality of second edges including bulges corresponding to the grooves, the grooves and the bulges located only at joints between the plurality of first edges and the plurality of second edges, the plurality of first edges and the plurality of second edges are fixedly connected through the grooves and the bulges, and the frame includes fixed grooves on edges of each of the plurality of first edges adjacent to the inorganic fireproof material and at least one through hole, wherein the inorganic fireproof material is filled within the fixed grooves and the at least one through hole.

2. The composite fireproof board according to claim 1, wherein the at least one through hole is provided on the frame, and the axial direction of the at least one through hole is substantially perpendicular to the surface of the composite fireproof board.

3. The composite fireproof board according to claim 1, wherein the at least one through hole is provided in at least one of the fixed grooves, and the axial direction of the at least one through hole is substantially parallel to the surface of the composite fireproof board.

4. The composite fireproof board according to claim 1, wherein the organic material comprises at least one of a plastic, organic glass, rubber, bamboo, wood, a stone plastic material, and a wood plastic material.

5. The composite fireproof board according to claim 1, wherein the middle layer has a thickness in a range of 3 mm to 300 mm.

6. The composite fireproof board according to claim 1, wherein the bottom layer has a thickness in a range of 0.5 mm to 15.5 mm, and the bottom layer is made of an inorganic fireproof material; and the surface layer has a thickness in a range of 0.5 mm to 15.5 mm, and the surface layer is made of an inorganic fireproof material.

7. The composite fireproof board according to claim 1, wherein the inorganic fireproof material comprises at least one of a magnesite material, a magnesium oxysulfide material, a magnesium oxychloride material, a calcium silicate material, or cement.

8. The composite fireproof board according to claim 1, wherein the lower reinforcement mesh layer and the upper reinforcement mesh layer are made of glass fiber mesh, carbon fiber mesh, plastic mesh, metal wire mesh.

9. The composite fireproof board according to claim 1, wherein the lower reinforcement mesh layer and the upper reinforcement mesh layer have a grid size having a first dimension of between 3 mm and 10 mm and a second dimension of between 3 mm and 10 mm.

10. The composite fireproof board according to claim 1, wherein the fixed grooves comprise one of a swallow-tailed groove, a T-shaped groove, and a cross groove.

11. The composite fireproof board according to claim 1, wherein a skin layer is further disposed on the surface layer, and the skin layer comprises one of impregnated paper, a wood plate, cork wood, a bamboo plate, a plastic film, ceramic tiles, leather, aluminum alloy, a plastic plate, a carpet, a stone plastic plate, and a wood plastic plate.

12. The composite fireproof board according to claim 11, wherein a balancer layer is further disposed below the bottom layer, the balancer layer comprises one of impregnated paper, a wood plate, a bamboo plate, cork wood, or foamed plastic.

13. The composite fireproof board according to claim 1, wherein a shape of the grooves is the same as a shape of the fixed grooves.

14. The composite fireproof board according to claim 1, wherein a shape of the grooves is different than a shape of the fixed grooves.

15. The composite fireproof board according to claim 1, wherein each of the plurality of first edges of the frame is longer than each of the plurality of second edges of the frame.

* * * * *